UNITED STATES PATENT OFFICE.

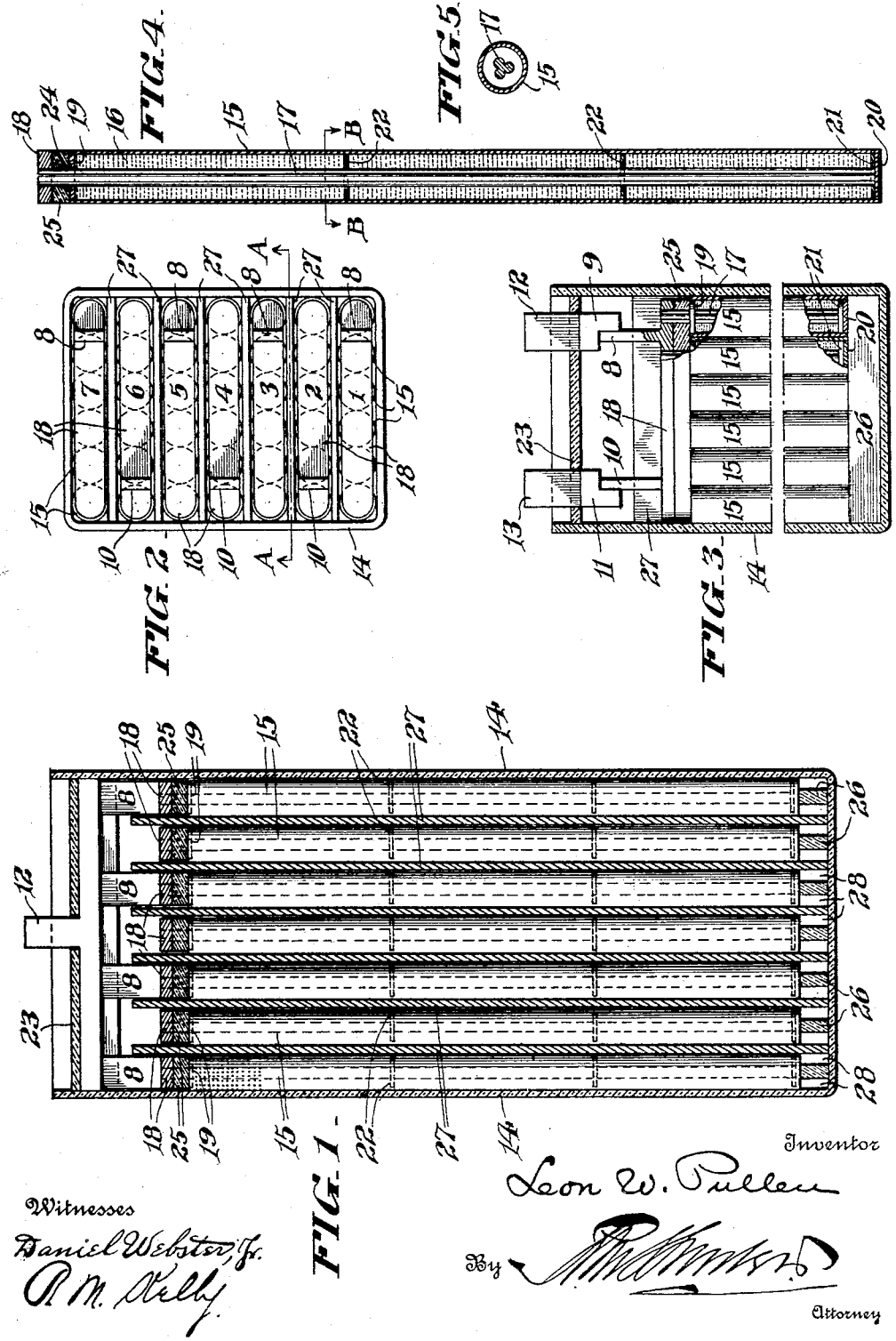

LEON W. PULLEN, OF PHILADELPHIA, PENNSYLVANIA.

ELECTRICAL ACCUMULATOR.

1,169,350.  Specification of Letters Patent.  Patented Jan. 25, 1916.

Application filed June 16, 1911.  Serial No. 633,583.

*To all whom it may concern:*

Be it known that I, LEON W. PULLEN, a citizen of the United States, and a resident of the city and county of Philadelphia and State of Pennsylvania, have invented an Improvement in Electrical Accumulators, of which the following is a specification.

It is the object of my invention to provide an electrical accumulator, or storage battery, of improved construction and increased efficiency.

My invention relates particularly to that type of batteries in which a series of plates are arranged side by side in the jar and each plate is formed of a series of electrodes composed of a tubular casing containing active material and a central core.

In the drawings: Figure 1 is a longitudinal vertical sectional view of a storage battery embodying my invention; Fig. 2 is a plan view of the same with the top removed; Fig. 3 is a transverse vertical section on the line A—A of Fig. 2; Fig. 4 is a vertical section on an enlarged scale of one of the electrodes; and Fig. 5 is a cross section of the same on the line B—B of Fig. 4.

The battery consists of a plurality of plates arranged side by side, with alternate plates connected together, and each plate consisting of a series of electrodes connected together at the top.

In Fig. 2, which is a plan view of the battery with the top removed, I have shown seven plates, 1, 2, 3, 4, 5, 6, 7, with plates 1, 3, 5, and 7 provided each at the same end with contact pieces 8 which are connected with a bar 9 in the top 23 of the cell, and the plates 2, 4, 6, provided each at the other end with contact pieces 10 which are connected with a bar 11 also in the top of the cell. The binding posts 12, 13 are carried by the bars 9 and 11, and the plates are inclosed in a jar or cell 14 which contains the electrolyte. This is the usual arrangement in batteries of this type.

Each of the electrodes which compose the plates consists essentially of a perforated tube or casing 15 of non-conducting material, containing the active material 16 and a central lead core 17.

The lead cores 17 are connected at the top by a bar 18 of lead, or other conducting material, and these bars of the alternately disposed plates are connected together by the contact pieces 8 and 10 as described.

The tubes or casings 15 consist of celluloid, or equivalent non-conducting material, provided throughout with minute perforations, as indicated at the top of the left hand tube in Fig. 1, and are sealed at the top and bottom by disks, 19, 20 respectively, of celluloid or equivalent material.

The lead cores 17 are of irregular cross section, preferably of the shape shown in Fig. 5. Secured to the lower end of each core is a disk 21 or enlargement, which lies immediately above the bottom 20 of the tube when the core is in place as shown in Figs. 2 and 4.

22, 22 are washers placed at intervals upon the cores and fitting within the tubes.

In constructing the electrodes the lead core is inserted in the empty tube, and the active material is then introduced and packed in to partly fill the tube above the disk 21, a washer 22 is then slipped down on the core on the top of the lower body of active material, more active material is then introduced and packed down and another washer 22 is introduced, the upper end of the tube is filled in with active material and the upper disk or washer 19 is fastened in the top of the tube with the end of the core projecting above it. The electrode is then complete and in condition to be combined with other similarly constructed electrodes to form one of the battery plates.

It will be noted that the lower end of the lead core is not connected with the bottom of the tube while the upper end projects through the disk 19 to which it may be secured, but I prefer to upset the metal of the core immediately about the disk as shown at 24 in Fig. 4. The column of active material within the tube bears directly upon the tube at the upper end, while at the lower end it bears upon the disk 21 or enlargement on the lower end of the core and not directly upon the tube. This arrangement serves to equalize the strains of expansion and contraction and enables the active material to be more tightly and uniformly packed without liability of distorting the tube or causing it to bulge at any point in its length.

To form a plate a number of electrodes are placed side by side with the tubes 15 in contact and the upper ends of the lead cores are fused to the cross bar 18. To prevent the burning or injury of the tops of the celluloid tubes 15 when the lead cores are fused to the connecting bar 18, I place a heat insulating bar 25 of hard rubber or other suitable material, through which the cores 17 project, between the tops of the tubes 15 and the connecting bar 18. Besides acting as a heat insulation to prevent the burning of the tops of the tubes when the cross bars 18 are fused on, this bar 25 acts as an insulation around the projecting tops of the lead cores and prevents them from coming in immediate contact with the electrolyte.

Secured to the bottoms of the tubes 15 of each plate is a relatively narrow strip 26 of celluloid, or equivalent material, which extends in the plane of the plate and forms a support for the plate in the jar.

The plates thus formed are placed side by side in the jar, preferably with separating board partitions 27 between them. These partitions are not, however, necessary to my battery and may be omitted.

When the plates are thus assembled, the bottoms of the electrodes do not rest directly upon the base of the jar, but are elevated therefrom, being supported by the strips 26. This produces at the bottom of each electrode a pocket or space 28, into which sediment, or displaced active material, may collect to a material extent without coming in contact with the bottoms of the electrodes and producing undesirable electrical discharges, such as frequently occur in batteries as now constructed. Furthermore each plate rests at the bottom on a support extending in its own plane, and there is, therefore, less jarring and liability of breakage than there would be if the plates rested on transverse supports, as is usual in batteries of this type as now constructed. The strips 26 also act as obstructions to the passage of the sediment freely over the base of the jar and thus prevent an accumulation of such sediment in any one place in sufficient quantity to reach the bottoms of the electrodes and produce electrical discharges.

The omission of transverse supports enables the partitions 27, when used, to extend down to the base and thus to further obstruct the accumulation of sediment to an objectionable extent on any part of the base.

While I do not mean to limit my invention in other respects to the particular form of the lead core, there is a special advantage in using a longitudinally grooved core, or a core of irregular cross section, in that such a core presents an increased area of contact to the active material with a comparatively small core, and thus a high efficiency is obtained from an electrode of comparatively small cross section. My experience has demonstrated that the best results in this respect are obtained with a core of the trifurcate shape shown.

The washers 22 fit snugly within the casing 15 and form transverse braces acting on the inner wall to brace it against external pressure whether from contact with the dividing partition with the walls of the jar, or with the adjacent electrodes. They should be similarly spaced in the electrodes of the same plate, so that the brace pieces in adjacent electrodes will act against one another thus similarly and equally bracing each electrode throughout the entire plate.

It is immaterial to the invention how many electrodes are united together to form a plate or how many plates are used to form a battery.

What I claim is:

1. An electrode for an electrical accumulator, comprising a perforated tube of non-conducting material, a core extending longitudinally through said tube and unconnected with it at one end and provided with an enlargement forming a bearing at its free end within the tube, and a column of active material within said tube bearing at one end upon one end of the tube and at the other end upon the bearing on the free end of the core.

2. An electrode for an electrical accumulator comprising a perforated tube of non-conducting material sealed at its upper end, a core extending longitudinally through said tube and projecting at its upper end through the sealed end of the tube and having its lower end unconnected with the tube and provided with an enlargement within the tube forming a bearing, and a column of active material within the tube supported at its lower end upon the bearing on the free end of the core.

3. An electrode for an electrical accumulator, comprising a perforated tube of non-conducting material sealed at its ends, a core extending longitudinally through said tube, projecting at one end through one of the sealed ends of the tube, and having its other end unconnected with the tube and provided with a disk or enlargement within the tube, a column of active material within the tube supported at one end upon the disk or enlargement on the free end of the core, and one or more non-conducting disks loose upon the core and tightly fitting the tube between its ends within the column of active material and acting to brace the inner wall against external pressure.

4. A plate for an electrical accumulator composed of a plurality of electrodes arranged side by side and each consisting of a long tubular non-conducting casing containing active material, a brace of non-conducting material fitting snugly within the casing between its ends and within the contained column of active material, and a core extending through the column of active material and the brace piece, the brace-pieces in adjacent electrodes being located in the same relative position so as to act against one another.

5. An electric accumulator composed of a casing having a rectangular interior, a series of plates each consisting of a plurality of tubes of non-conducting material arranged in a row and having their lower ends sealed, said tubes provided with metallic cores electrically connected at the top by a metal bar and said tubes having a filling of active material about the cores, a non-conducting partition between each pair of plates and extending below the bottom of said plates and resting on the bottom of the inclosing casing, a flat strip secured to the bottom of the plate and removable therewith, said strip supporting the plate and arranged in parallel relation with the width thereof and with respect to the adjacent partitions and also of a lateral thickness greatly less than the thickness of the plate, the length of said strip approximating the width of the plate and partitions, whereby said partitions and strips are arranged parallel and alternately and provide a plurality of separate parallel compartments beneath the plates to hold any active material which collects in the several compartments in the bottom of the accumulator from shifting into direct association.

6. As a new article of manufacture, a plate for an electrical accumulator comprising a plurality of perforated tubes of non-conducting material arranged in a row and having their lower ends sealed by non-conducting disks, a separate core for each tube extending longitudinally into said tube and terminating above the lower sealed ends thereof and electrically connected at the top, a metal bar connecting the upper ends of the cores and a continuous flat strip of non-conducting material secured to and extending downwardly from and in the same plane of the plate and of a thickness greatly less than the thickness of the plate and forming a continuous supporting fin for said plate.

7. A plate for an electrical accumulator consisting of a plurality of perforated tubes of non-conducting material arranged in a row and sealed at both the upper and lower ends by non-conducting disks, an insulating bar secured across the upper sealed ends of the tubes, a continuous thin narrow supporting rib of non-conducting material secured across the lower sealed ends of the tubes, cores extending longitudinally through the upper insulating bar and upper sealed ends of the tubes and terminating above the lower sealed ends of said tubes, active material within the tubes surrounding said cores, and a conducting cross bar connecting the upper ends of the cores which project through the insulating bar.

In testimony of which invention I hereunto set my hand.

LEON W. PULLEN.

Copies of this patent may be obtained for five cents each, by addressing the "Commissioner of Patents, Washington, D. C."